(12) United States Patent
Kadowaki et al.

(10) Patent No.: US 8,953,043 B2
(45) Date of Patent: Feb. 10, 2015

(54) PARKING ASSISTANCE DEVICE CONFIGURED TO GENERATE FORWARD GUIDE MARKERS

(75) Inventors: Jun Kadowaki, Kariya (JP); Yu Tanaka, Nagoya (JP); Kenji Miura, Chiryu (JP); Tetsuya Maruoka, Anjo (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 0 days.

(21) Appl. No.: 13/817,231

(22) PCT Filed: Aug. 22, 2011

(86) PCT No.: PCT/JP2011/068858
§ 371 (c)(1),
(2), (4) Date: Feb. 15, 2013

(87) PCT Pub. No.: WO2012/043092
PCT Pub. Date: Apr. 5, 2012

(65) Prior Publication Data
US 2013/0162829 A1 Jun. 27, 2013

(30) Foreign Application Priority Data

Sep. 29, 2010 (JP) ................. 2010-219939

(51) Int. Cl.
*H04N 9/47* (2006.01)
*H04N 7/18* (2006.01)
B62D 15/02 (2006.01)
*B60R 1/00* (2006.01)

(52) U.S. Cl.
CPC ............... *H04N 7/18* (2013.01); *B62D 15/028* (2013.01); *B62D 15/0285* (2013.01); *B60R 1/00* (2013.01); *B60R 2300/806* (2013.01)

USPC .......................................................... 348/148

(58) Field of Classification Search
USPC ........................... 348/148; 701/201, 421, 523
See application file for complete search history.

(56) References Cited

U.S. PATENT DOCUMENTS 6,334,089 B2 * 12/2001 Hessing ........................ 701/421
7,640,107 B2 * 12/2009 Shimizu et al. ............... 701/523
(Continued)

FOREIGN PATENT DOCUMENTS

| CN | 1793785 A | 6/2006 |
| CN | 1819944 A | 8/2006 |

(Continued)

OTHER PUBLICATIONS

English Translation of International Preliminary Report on Patentability for PCT/JP2011/068858 dated May 2, 2013.
(Continued)

*Primary Examiner* — Dave Cekaj
*Assistant Examiner* — Leron Beck
(74) *Attorney, Agent, or Firm* — Sughrue Mion, PLLC (57) ABSTRACT

A parking assistance device with a simple configuration that flexibly guides a vehicle to a reverse start position in assisting reverse parking computes a guide route for allowing the vehicle to move forward to a reverse start position and then reverse to the parking target and the reverse start position based on the parking target with a predetermined tolerance included, generates forward guide markers constituted by a marker group including a far marker corresponding to the reverse start position and a near marker that represents an area via which the vehicle can reach the reverse start position and is located closer to the vehicle than the far marker, the forward guide markers indicating a forward route to the reverse start position by an arrangement of the marker group the width of which is increased toward the near marker from the far marker, and superimpose the markers on the surrounding image.

4 Claims, 8 Drawing Sheets

(56) References Cited

U.S. PATENT DOCUMENTS

| | | | |
|---|---|---|---|
| 7,706,944 B2 | 4/2010 | Tanaka et al. | |
| 7,825,828 B2 | 11/2010 | Watanabe et al. | |
| 8,285,479 B2 | 10/2012 | Kawabata et al. | |
| 2004/0201670 A1* | 10/2004 | Mizusawa et al. | 348/136 |
| 2006/0190147 A1 | 8/2006 | Lee et al. | |
| 2007/0146166 A1 | 6/2007 | Sato et al. | |
| 2010/0089677 A1 | 4/2010 | Tanaka et al. | |
| 2010/0114434 A1 | 5/2010 | Kawabata et al. | |
| 2010/0161208 A1* | 6/2010 | Akita et al. | 701/201 |

FOREIGN PATENT DOCUMENTS

| | | |
|---|---|---|
| CN | 101626921 A | 1/2010 |
| EP | 2 003 021 A2 | 12/2008 |
| EP | 2 060 465 A1 | 5/2009 |
| JP | 2006-160147 A | 6/2006 |
| JP | 2006-290051 A | 10/2006 |
| JP | 2006-312439 A | 11/2006 |
| JP | 2006-312440 A | 11/2006 |
| JP | 2008-221894 A | 9/2008 |
| JP | 4414959 B2 | 2/2010 |

OTHER PUBLICATIONS

Extended European Search Report issued in European Application No. 11828653.3 dated Jul. 3, 2013.

International Search Report of PCT/JP2011/068858, dated Nov. 8, 2011.

Chinese Office Action issued Nov. 4, 2014 in Chinese Patent Application No. 201180041883.5.

* cited by examiner

PARKING ASSISTANCE DEVICE CONFIGURED TO GENERATE FORWARD GUIDE MARKERS

CROSS REFERENCE TO RELATED APPLICATIONS

This is a National Stage of International Application No. PCT/JP2011/068858 filed Aug. 22, 2011, claiming priority based on Japanese Patent Application No. 2010-219939 filed Sep. 29, 2010, the contents of all of which are incorporated herein by reference in their entirety.

TECHNICAL FIELD

The present invention relates to a parking assistance device that assists the driving operation of a vehicle at the time of parking.

BACKGROUND ART

In order to reduce the burden of the driving operation on a driver at the time of parking a vehicle, a variety of parking assistance techniques have been proposed and put into practical use. In "garage" parking where a vehicle is put into a parking space with its back first, the vehicle first moves forward beyond a parking space, stops, and then reverses into the parking space. In assisting this reverse parking, it is important to guide the vehicle appropriately to a reverse start position at which the vehicle stops moving forward and starts reversing. Japanese Patent No. 4414959 (Patent Document 1) discloses a technique where guide information marks G1 and G2 (see FIGS. 9 to 11 of Patent Document 1) serving as targets during forward movement are displayed on a monitor, and the vehicle is allowed to move forward so that such guide information marks fall within a frame indicator H (see the same figures), thereby guiding the vehicle to an appropriate reverse start position.

PRIOR ART DOCUMENTS

Patent Document

Patent Document 1: Japanese Patent No. 4414959

DISCLOSURE OF THE INVENTION

Problem to be Solved by the Invention

The movement to the reverse start position described above is implemented by a driving operation by a driver. When the driving operation is not appropriate, such as when the turning amount of the steering wheel is excessive or insufficient, there is the possibility of the vehicle failing to head for an appropriate reverse start position. Patent Document 1 provides a control of performing automatic correction when the driving operation by the driver is not appropriate. To achieve such automatic correction, however, it is necessary to provide, not only a control system for displaying guide information, but also an additional control system such as an automatic steering system. Also, as for the reverse start position, there is not only one single given position that is correct, but some degree of leeway is allowed within a range where a reverse route from the reverse start position to the parking space is secured. Accordingly, as long as guiding to an appropriate reverse start position is possible within the allowable range, no problem will occur even though the forward route is not actually corrected. If parking assistance is achieved with a simpler configuration without the necessity of any additional control system, even low-priced vehicles can be equipped with a parking assistance function, and thus burdens of the driving operation on many drivers can be reduced.

In view of the problems described above, it is desirable to provide, with a simple configuration, a parking assistance technique capable of flexibly guiding a vehicle to a reverse start position in assisting reverse parking.

Means for Solving Problem

A characteristic configuration of a parking assistance device of the present invention includes:

a surrounding image presenting section configured to receive a shot image of at least a view in a direction of movement of a vehicle taken by a car-mounted camera and allow a surrounding image of the vehicle to be displayed on a monitor device inside the vehicle;

a parking target setting section configured to set a parking target of the vehicle;

a route computing section configured to compute a guide route for allowing the vehicle to move forward to a reverse start position and then reverse to the parking target and the reverse start position based on the parking target with a predetermined tolerance included; and a graphic control section configured to generate forward guide markers constituted by a marker group including a far marker corresponding to the reverse start position and a near marker that represents an area via which the vehicle can reach the reverse start position and is located closer to the vehicle than the far marker, the forward guide markers indicating a forward route to the reverse start position by an arrangement of the marker group the width of which is increased toward the near marker from the far marker, and superimpose the markers on the surrounding image.

According to the above configuration, the forward guide markers are formed of a marker group including a plurality of markers. Therefore, the forward route can be presented so as to be easily understood by the driver. Also, the near marker formed closest to the vehicle represents an area via which the vehicle can reach the reverse start position, and is drawn to have a width larger than the far marker. Therefore, the driver can start to move the vehicle to the reverse start position with a comparatively high degree of leeway. In other words, since some error is allowed in the amount of turning of the steering wheel, etc., the parking assistance device can be implemented with a simple configuration without the necessity of using a control system that corrects the actual forward route. Moreover, the width of the markers of the marker group constituting the forward guide markers is increased toward the near marker from the far marker. Since the far marker is the marker corresponding to the reverse start position, the driver can be given a sense that the forward guide markers converge into the reverse start position. Thus, according to this configuration, it is possible to provide, with a simple configuration, a parking assistance device capable of flexibly guiding a vehicle to the reverse start position in assisting reverse parking.

Preferably, the parking assistance device of the present invention further includes: a self-location estimating section configured to estimate the self-location based on detection results from a sensor that detects the movement state of the vehicle, wherein the route computing section updates the guide route and the reverse start position based on the self-location of the vehicle moving toward the reverse start position and the parking target, and the graphic control section updates the forward guide markers including at least the far marker based on the updated guide route and reverse start position and superimposes the updated forward guide markers on the surrounding image. While the near marker is a wide marker representing an area via which the vehicle can reach the reverse start position, it is not necessarily optimal to move toward the reverse start position set at the start of forward movement even after the vehicle has passed through a place indicated by the near marker. The reverse start position is a position at which the vehicle starts reversing toward the parking target, i.e., a position at which the vehicle starts reversing so as to be able to reach the parking target. Therefore, it is not necessarily required to start reversing from the reverse start position set at the start of forward movement, but reversing may just be started from an optimal reverse start position according to the actually undertaken forward route. According to this configuration, the guide route and the reverse start position are updated according to the actual forward route, and the forward guide markers are updated according to the updated results. Thus, errors in the amount of turning of the steering wheel, etc. from the start of forward movement are reflected in the forward guide markers, allowing the vehicle to be well guided toward the far marker indicating the reverse start according to the actual forward route.

Preferably, in the parking assistance device of the present invention, a plurality of car-mounted cameras are mounted on the vehicle, and the surrounding image includes an overhead image as a composite image formed based on a plurality of shot images by the plurality of car-mounted cameras, and even after the vehicle has reached the markers constituting the forward guide markers, the graphic control section superimposes the markers on the overhead image at least until the vehicle reaches the reverse start position. For example, when the image of the front view taken by the front camera that captures an image of the front of the vehicle as a car-mounted camera is the surrounding image, the visual point of the surrounding image is at the front end of the vehicle. Therefore, any marker reached by the vehicle, among the forward guide markers, is behind the visual point, and thus can no more be superimposed on the surrounding image. Conversely, when the surrounding image is an overhead image obtained by combining the images captured by the plurality of car-mounted cameras, the visual point of the surrounding image is a virtual point located above the vehicle. With the visual point above the vehicle, any forward guide marker already reached by the vehicle is not behind the visual point. Also, the shape of the entire vehicle is presented on the surrounding image as an illustration, a previously-taken picture, etc. Accordingly, any marker already reached by the vehicle can be displayed under (on the back of) the vehicle as if the vehicle is proceeding over the marker. By drawing the forward guide markers under the vehicle along with the forward movement of the vehicle, the movement history of the vehicle can be shown virtually. Thus, the driver can check the trajectory of the vehicle, and this enhances the convenience.

DESCRIPTION OF EMBODIMENTS

An embodiment of the present invention will be described hereinafter with reference to the accompanying drawings. In this embodiment, described as an example is a parking assistance device (drive assistance device) capable of generating an overhead image of a vehicle viewed from above based on images captured by a plurality of cameras mounted on the vehicle and displaying the generated image on a monitor device. By use of an overhead image, the device can assist the driver in a driving operation and in monitoring for an obstacle, etc. in the surroundings of the vehicle.

Figure 1:
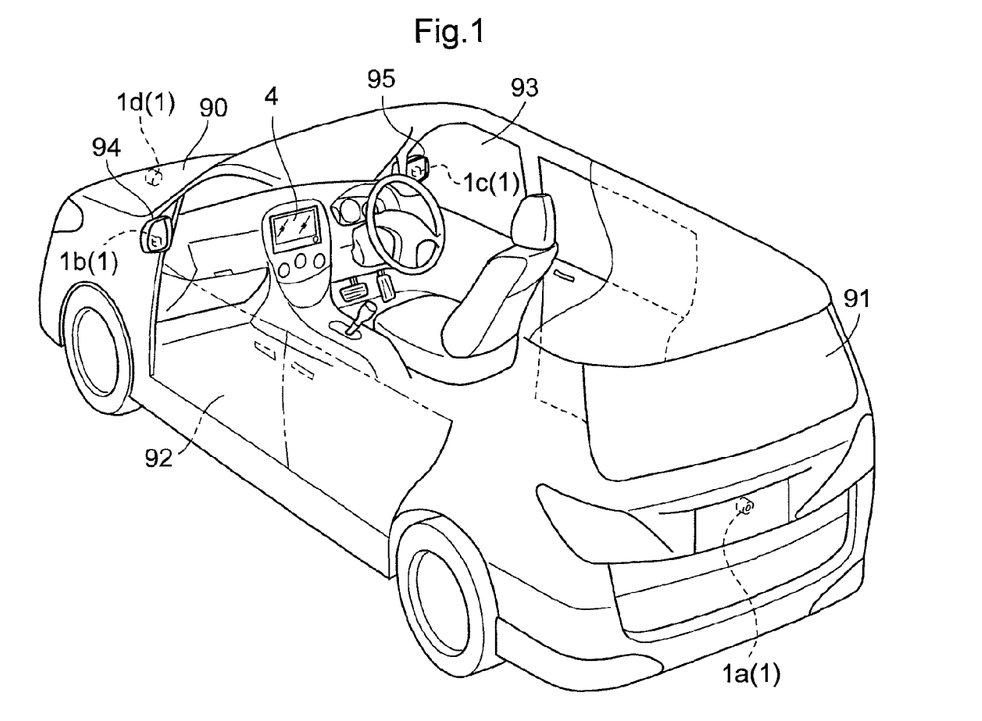
FIG. 1 is a cutaway perspective view of a vehicle.
Figure 2:
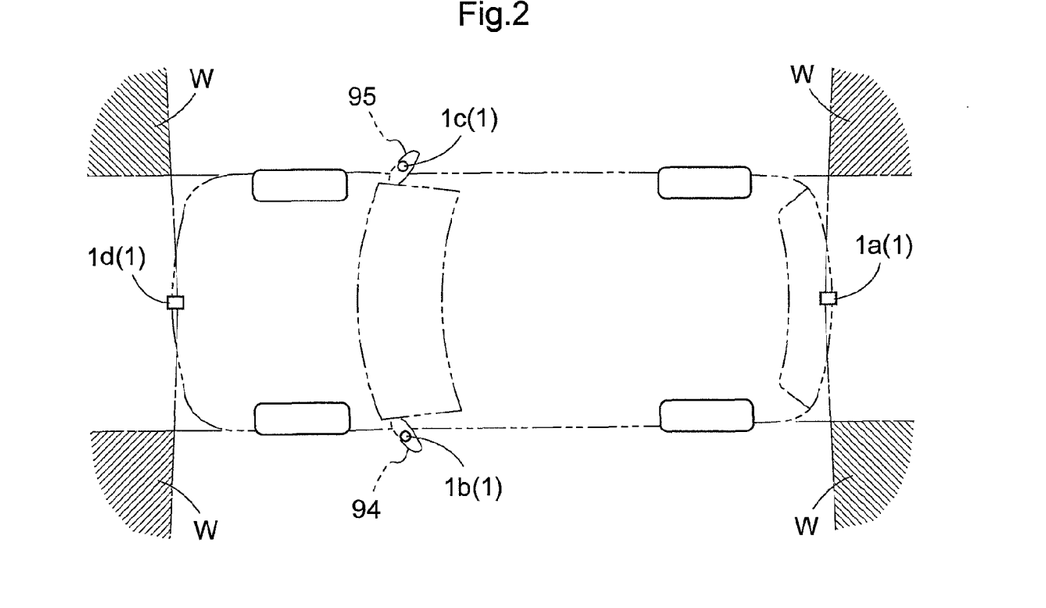
FIG. 2 is a plan view showing shooting ranges of cameras.

A vehicle 90 has a plurality of car-mounted cameras 1. Specifically, as shown in FIGS. 1 and 2, a rear camera 1*a* is mounted on the rear of the vehicle 90, i.e., on a luggage door 91. A left-side camera 1*b* is mounted on the bottom of a left-side mirror 94 attached to a left front door 92, and a right-side camera 1*c* is mounted on the bottom of a right-side mirror 95 attached to a right front door 93. A front camera 1*d* is mounted on the front of the vehicle 90. In the description to follow, these cameras 1*a* to 1*d* are collectively referred to as the cameras 1 (car-mounted cameras).

Each of the cameras 1 is a digital camera that takes 15 to 30 frames of two-dimensional images per second in a time sequence using an imaging device such as a charge coupled device (CCD) and a CMOS image sensor (CIS), converts the images to digital data, and outputs the resultant moving-image data (shot images) in real time. The camera 1 includes a wide-angle lens: especially, in this embodiment, a viewing angle of 140 to 190° in the horizontal direction is secured. The rear camera 1*a* and the front camera 1d are mounted on the vehicle 90 at a downward tilt angle of about 30 degrees with respect to the optical axis, to permit shooting of an area of up to about 8 m from the vehicle 90. The left-side camera 1*b* and the right-side camera 1*c* are mounted on the bottoms of the side mirrors 94 and 95 with their optical axes facing downward, to permit shooting of part of the sides of the vehicle 90 and the road surface (ground).

Figure 3:
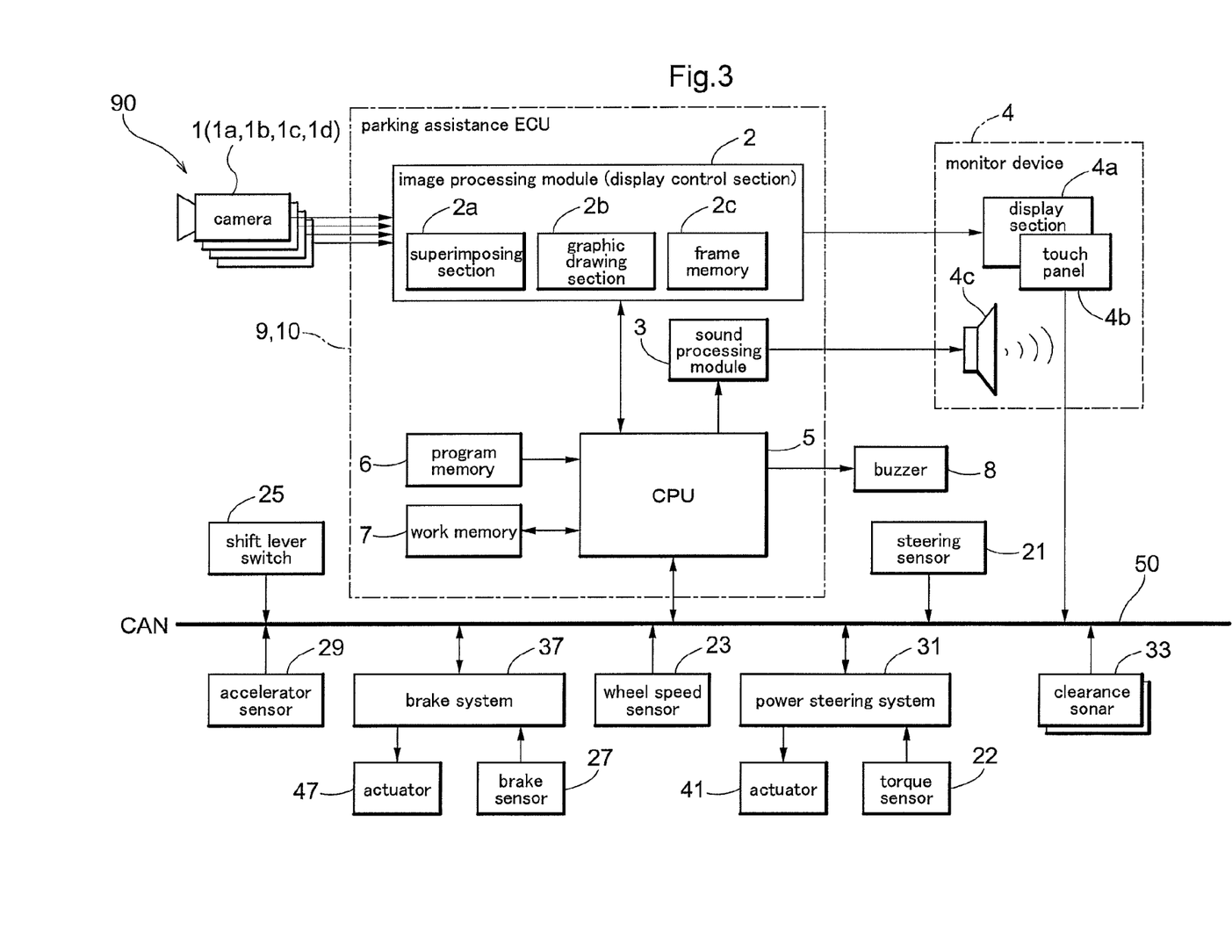
FIG. 3 is a block diagram schematically showing an example system configuration of the vehicle.

Images taken by the cameras 1 can be displayed on a monitor device 4 via an image processing module 2 having a superimposing section 2*a*, a graphic drawing section 2*b*, a frame memory 2*c*, etc., as shown in FIG. 3. The two-dimensional image of each frame is stored in the frame memory 2*c*, permitting image processing and superimposition of graphics for each frame. In addition, the image processing module 2 can combine images taken by the plurality of cameras 1 together to generate a wider-field composite image, and also change the visual points of the captured images and the composite image to generate an overhead image.

Overlap areas W (see FIG. 2) of images captured by two cameras at positions external to the corners of the front and rear of the vehicle 90, and image processing is performed to make the boundaries of these overlap regions W less conspicuous, thus generating a composite image. Also, the visual point of the composite image is changed, and an appearance image (graphic image) of the roof of the vehicle 90 is superimposed on the visual point-changed image, to generate an overhead image. This graphic image may be an illustration image diagrammatically or meticulously depicting the appearance of the roof of the vehicle 90, or a picture image or a video image actually taken of the roof of the vehicle 90. Naturally, images captured by the cameras 1 may be individually subjected to the visual point change, and the visual point-changed images captured by the plurality of cameras 1 may be combined. Since image processing techniques on the composition of a plurality of shot images and the visual point change of images are known, detailed description of these is omitted herein. An instruction to draw graphics given to the graphic drawing section 2b and an instruction to superimpose graphics given to the superimposing section 2a are issued by a central processing unit (CPU) 5 to be described later.

A monitor device for a navigation system, for example, doubles as the monitor device 4. As shown in FIG. 3, the monitor device 4 has a display section 4a, a touch panel 4b formed on the display section 4a, and a speaker 4c, The display section 4a displays images captured by the cameras 1, graphic images, a composite image obtained by combining these images, etc. presented from the image processing module 2. The display section 4a is constituted by a liquid crystal display as an example. The touch panel 4b, formed together with the display section 4a, is a pressure-sensitive or electrostatic instruction input device capable of outputting a touch position by a finger, etc. as location data. The speaker 4c is disposed in the monitor device 4 in FIG. 3 as an example, but it may be disposed on any other place of the vehicle such as on the inner side of a door. The speaker 4c outputs a sound transferred from a sound processing module 3 under instructions from the CPU 5. Note that the CPU 5 may otherwise simply beep via a beeper 8.

The CPU 5 performs high-level computation processing such as image recognition and route prediction, serving as the core of the parking assistance device 10. The CPU 5 executes various types of computation processing using programs and parameters stored in a program memory 6. The CPU 5 also stores captured images, etc. in a work memory 7 temporarily as required, to execute computation. The program memory 6 and the work memory 7 are shown as memories independent from the CPU 5 in the illustrated example, but they may be integrated into the same package as the CPU 5. The parking assistance device 10 is configured as a parking assistance electronic control unit (ECU) 9 including the CPU 5 and the memories as well as other peripheral circuits. Although the CPU 5 is used as the core in the illustrated example, the parking assistance device 10 may be configured using any other logic operation processor or logic circuit, such as a digital signal processor (DSP), as the core.

The CPU 5 is connected to various systems and sensors via an in-car network represented by the reference numeral 50 in FIG. 3 to permit communication with these components. In this embodiment, a controller area network (CAN) 50 is shown as the in-car network. As shown in FIG. 3, the parking assistance device 10 (CPU 5) is connected to a power steering system 31 and a brake system 37 inside the vehicle. These systems are individually configured with an electronic circuit such as a CPU as the core, like the parking assistance device 10, and also configured with an ECU including peripheral circuits as the core, like the parking assistance ECU 9.

The power steering system 31 is an electric power steering (EPS) system or a steer-by-wire (SBW) system. This system permits application of an assist torque to the steering wheel operated by the driver by means of an actuator 41. It also permits automatic steering where the steering wheel is driven by the actuator 41. The brake system 37 is an anti-lock braking system (ABS) that suppresses locking of the brake, an electronic stability control (ESC) device that suppresses skidding of the vehicle during cornering, an electric brake system having a brake assist that enhances the braking force, or a brake-by-wire (BBW) system. This system permits application of a braking force to the vehicle 90 via an actuator 47.

In FIG. 3, as examples of the sensors, a steering sensor 21, a wheel speed sensor 23, a shift lever switch 25, and an accelerator sensor 29 are connected to the CAN 50. The steering sensor 21 is a sensor that detects the steering amount (rotational angle) of the steering wheel, and is constructed using a Hall device, etc., for example. The parking assistance device 10 acquires the steering amount of the steering wheel operated by the driver and the steering amount during automatic steering from the steering sensor 21, to execute various types of control.

The wheel speed sensor 23 is a sensor that detects the rotational amount and the number of revolutions per unit time of the wheels of the vehicle 90, and is constructed using a Hall device, etc., for example. The parking assistance device 10 computes the shift amount, etc. of the vehicle 90 based on information acquired from the wheel speed sensor 23, to execute various types of control. The wheel speed sensor 23 may be included in the brake system 37 in some cases. The brake system 37 detects symptoms such as locking of the brake, spinning of the wheels, and skidding, etc. from a difference in rotation between the right and left wheels, etc., to execute various types of control. When the wheel speed sensor 23 is included in the brake system 37, the parking assistance device 10 acquires the information via the brake system 37. A brake sensor 27 is a sensor that detects the operation amount of the brake pedal, and the parking assistance device 10 acquires the information via the brake system 37. When the brake pedal is depressed during automatic steering, for example, the parking assistance device 10 can exert control such as suspending or terminating the automatic steering interpreting that the vehicle is under an environment improper for the automatic steering.

The shift lever switch 25 is a sensor or a switch that detects the position of the shift lever, and is constructed using a displacement sensor, etc. For example, the parking assistance device 10 can start assistance control when the lever is shifted to reverse, or can terminate the assistance control when it is changed from reverse to forward. A torque sensor 22 that detects the operation torque for the steering wheel can also detect whether or not the driver is gripping the steering wheel. When the driver grips the steering wheel tightly during automatic steering, the parking assistance device 10 can exert control such as suspending or terminating the automatic steering interpreting that the vehicle is under an environment improper for the automatic steering. Also, creeping of the vehicle 90 by idling of the engine is generally used for automatic steering. Therefore, when the accelerator sensor 29 detects depression of the accelerator by the driver, the parking assistance device 10 can exert control such as suspending or terminating the automatic steering interpreting that the vehicle is under an environment improper for the automatic steering.

The systems and the sensors, as well as the connecting forms thereof, shown in FIG. 3 are mere examples, and other configurations and connecting forms may be used. Also, as described earlier, the sensors may be connected to the CAN 50 directly or indirectly via corresponding systems.

As described above, the parking assistance device 10 is configured with the CPU 5 as the core, and executes various types of computation for parking assistance in cooperation with programs (software) stored in the program memory 6. Examples of the types of parking assistance include:
(1) displaying an image of a view behind the vehicle on a monitor mounted in the vehicle, as well as superimposing guide lines such as car-width extension lines and predicted route lines on the image;
(2) setting the parking target and guiding the driver's operation under instructions by voice, etc.; and
(3) guiding the vehicle to the parking target by automatic steering while the driver is only adjusting the speed. In (2) and (3), the parking target is set. This setting of the parking target can be done by various methods including:
(a) setting a predetermined position from the vehicle as the initial position of the parking target based on the stop position of the vehicle at the start of parking assistance,
(b) setting the parking target by recognizing, on an image, division lines defining a parking stall, for example,
(c) setting the parking target by detecting a vacant area by sonar (clearance sonar 33), etc. during passing beyond a parking target position to perform automatic recognition, and
(d) combining a plurality of methods such as (b) to (c) above for improving the precision. In any of (a) to (d), the parking target can be finely adjusted by the driver manually in many cases.

In this embodiment, type (2) above is assumed, where the driver performs the driving operation, and the parking assistance device 10 guides the operation by voice, etc. Alternatively, the driver may perform the driving operation until reaching a reverse start position, and after shifting of the lever to reverse at the reverse start position, the vehicle may be guided to the parking target by automatic steering, as mentioned above under (3).

Figure 4:
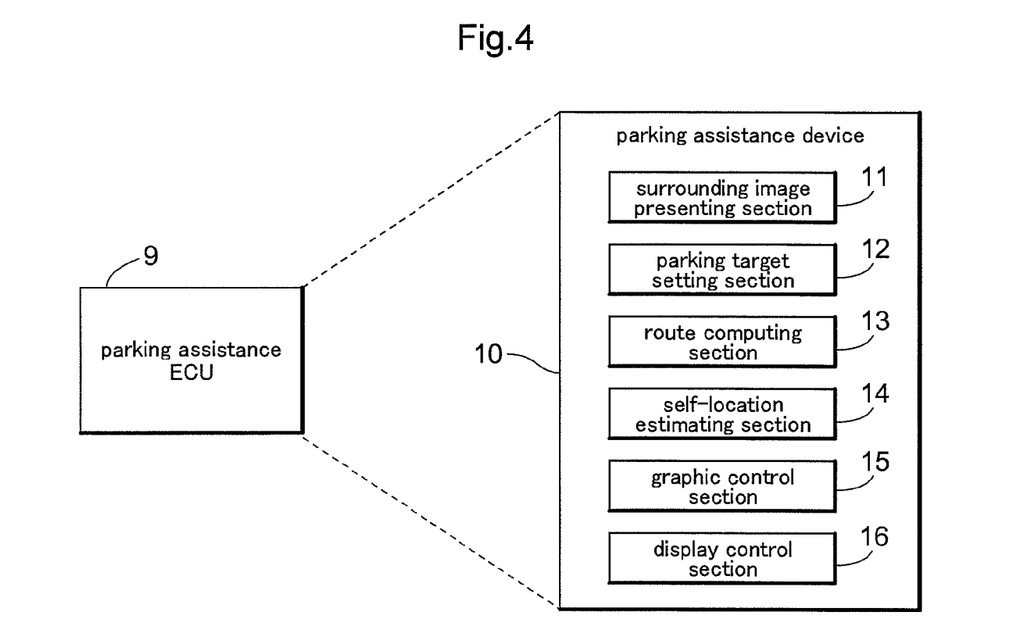
FIG. 4 is a block diagram schematically showing an example functional configuration of a parking assistance device.

The parking assistance device 10 includes, as functional sections, a surrounding image presenting section 11, a parking target setting section 12, a route computing section 13, a self-location estimating section 14, a graphic control section 15, and a display control section 16, as shown in FIG. 4. These functional sections are implemented in cooperation with the hardware configured as the parking assistance ECU 9 and software.

The surrounding image presenting section 11 is a functional section that presents a surrounding image of the vehicle 90 to be displayed on the monitor device 4 inside the vehicle 90. The surrounding image may be a captured image taken by one camera 1 or an overhead image obtained by combining captured images taken by a plurality of cameras 1. In other words, the surrounding image presenting section 11 is a functional section of receiving a captured image taken by a camera 1 of at least a view in the direction of movement of the vehicle 90 and making the surrounding image of the vehicle 90 display on the monitor device 4. The direction of movement of the vehicle 90 refers to the movement direction corresponding to the position of the shift lever and the vehicle 90 does not have to be actually moving. For example, when the shift lever is at the drive position, a surrounding image including a image captured by the front camera 1d is displayed. When it is at the reverse position, a surrounding image including a image captured by the rear camera 1a is displayed. Note however that, irrespective of the position of the shift lever, images captured by any cameras 1 including the side cameras 1b and 1c, a composite image, an overhead image, etc. may be displayed by intentional operations by the driver using touch buttons on the touch panel 4b, other switches, etc.

The parking target setting section 12 is a functional section that sets the parking target of the vehicle 90. The parking target is set by a method as those shown under (a) to (d) above, the details of which will be described later. The route computing section 13 is a functional section that computes the guide route for allowing the vehicle 90 to move forward to the reverse start position and then reverse to the parking target, as well as the reverse start position, based on the parking target. The route computing section 13 computes the guide route and the reverse start position with predetermined tolerances included, the details of which will be described later. The self-location estimating section 14 is a functional section that estimates the self-location of the vehicle 90 based on the detection results from the sensors detecting the movement state of the vehicle 90, such as the steering sensor 21 and the wheel speed sensor 23. Note that the route computing section 13 occasionally updates the guide route and the reverse start position based on the self-location of the vehicle 90 moving toward the reverse start position and the parking target.

Figure 10:
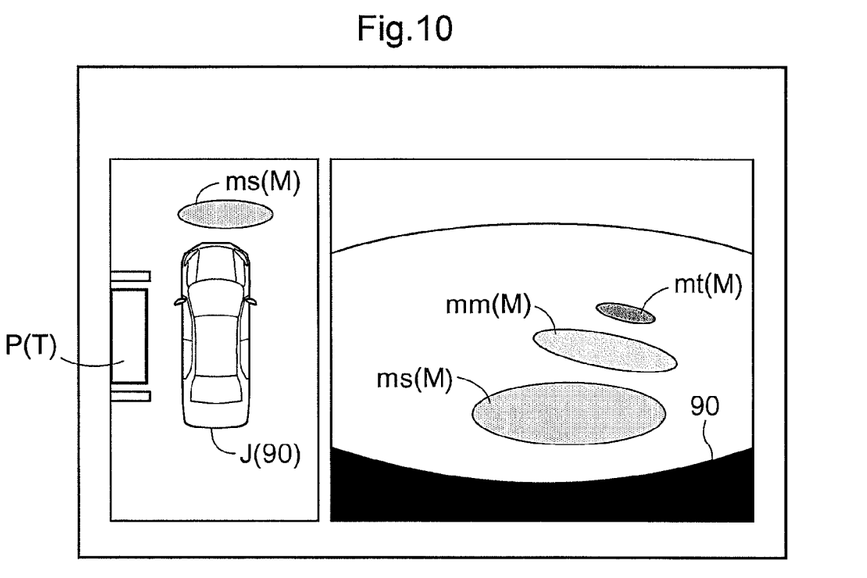
FIG. 10 is a view showing example forward guide markers during turning.

The graphic control section 15 is a functional section that generates forward guide markers for guiding the route of the vehicle 90 up to the reverse start position and superimposes the markers on the surrounding image. As shown in FIG. 10, for example, forward guide markers M are constituted by a marker group including a far marker mt corresponding to the reverse start position and a near marker ms located closer to the vehicle 90 than the far marker mt indicating an area via which the vehicle 90 can reach the reverse start position, which will be described later in detail. As described above, since the reverse start position has been computed with a predetermined tolerance included by the route computing section 13, the near marker ms is flexibly set as an area via which the vehicle 90 can reach the reverse start position. Also, as shown in FIG. 10, the forward guide markers M are generated to indicate a forward route K1 (see FIG. 8) toward the reverse start position by the arrangement of the marker group that is gradually widened from the far marker mt toward the near marker ms. The graphic control section 15 updates the forward guide markers M including at least the far marker mt based on the guide route and the reverse start position updated based on the self-location and the parking target, and superimposes the updated markers on the surrounding image. The display control section 16 is a functional section that superimposes the surrounding image, the forward guide markers M, other icons and messages, etc. on top of one another and presents the resultant image to the monitor device 4 as one display image.

Figure 5:
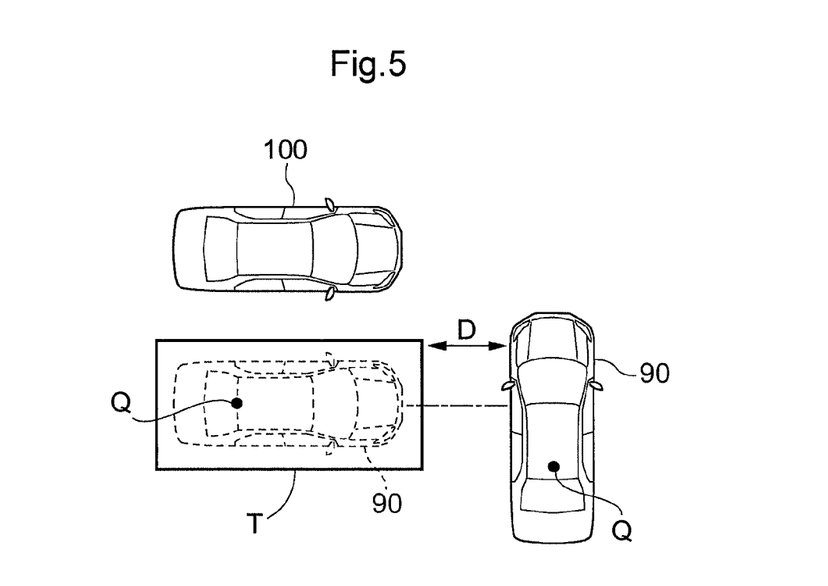
FIG. 5 is a view showing an example method of setting a parking target using a stop position.
Figure 6:
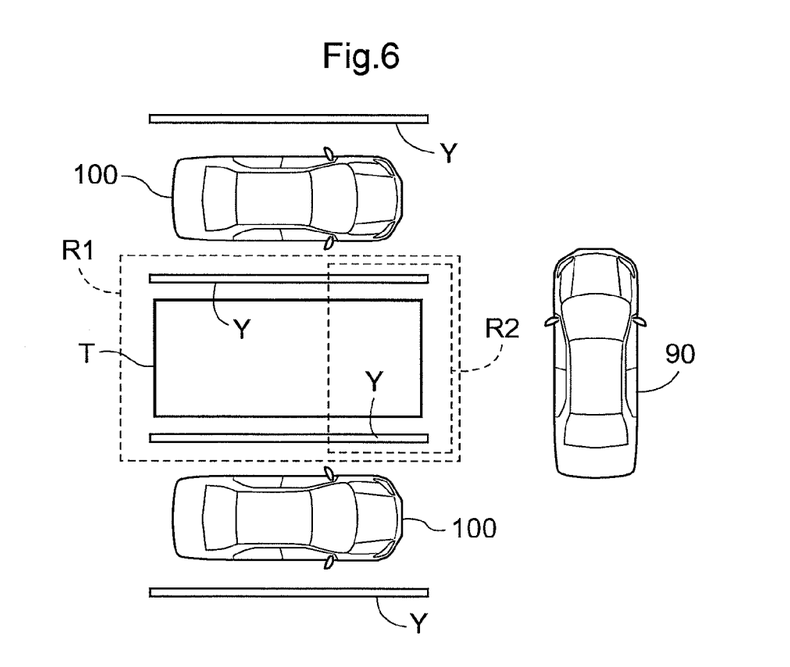
FIG. 6 is a view showing an example method of setting a parking target using image recognition.
Figure 7:
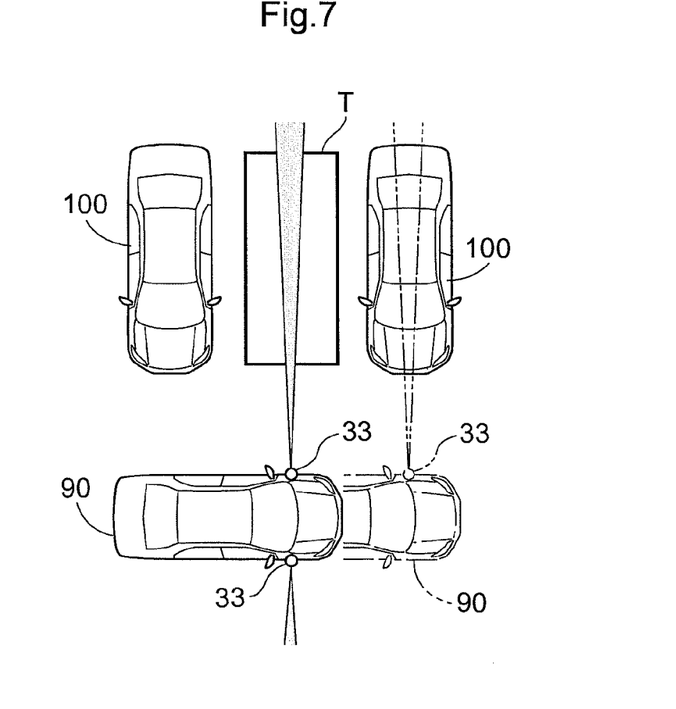
FIG. 7 is a view showing an example method of setting a parking target using sonar.

Referring to FIGS. 5 to 14, a specific example of the parking assistance device 10 will be described hereinafter. First, the principle of the parking assistance will be described with reference to FIGS. 5 to 8. FIGS. 5 to 7 respectively illustrate the methods of setting the parking target corresponding to (a), (b), and (c) described above. In these figures, the reference numeral 100 denotes another vehicle (parked vehicle) already parked. Referring to FIGS. 5 to 7, specific examples of setting the parking target T by the parking target setting section 12 will be first described.

As shown in FIG. 5, the parking assistance device 10 sets a predetermined position from the vehicle 90 as the initial position of the parking target T based on the stop position of the vehicle 90 at the start of the parking assistance. The vehicle 90 moves forward passing close by a parking stall that is to be the parking target, and temporarily stops at a position where approximately the center of the parking stall is in line with the driver's seat as indicated by the dot-dashed line. In other words, in FIG. 5, the driver temporarily stops the vehicle 90 at a position where he or she can visually recognize the center of the parking stall through the left-side window. The parking target T is set at a predetermined position with respect to the temporary stop position. For example, the parking target T having a predetermined size is set at a position laterally apart from the vehicle 90 by a distance D. The parking target T is set on reference coordinates (world coordinates) having a reference position Q of the vehicle 90, e.g., the intersection point of the axis of the rear wheels and the axle extending through the length of the vehicle 90, serving as the reference.

FIG. 6 shows an example of setting the parking target T in a parking stall by recognizing, on an image, the parking stall defined by division lines (road marking) Y such as white lines. Ideally, it is preferable to recognize the parking stall by acquiring a captured image including the entirety of the division lines Y as indicated by a broken line R1 in FIG. 6 by the left-side camera 1b, for example. However, when the field of the left-side camera 1b in the lateral direction is not set to cover a far distance, part of the division lines Y may be recognized as indicated by a broken line R2 in FIG. 6, and the parking target T may be set on the reference coordinates using the end of the parking stall closer to the vehicle 90 as the start point. Although not shown in FIG. 6, the parking target T is set on the reference coordinates using the reference position Q of the vehicle 90 as in FIG. 5.

In general, since the color of the road surface is dark like the color of asphalt while the color of the road marking such as the division lines Y is light such as white and yellow, the contrast of the division lines Y is high. Therefore, the road marking can be easily detected by known edge detection. Also, since most part of the division lines Y is formed of straight lines in real space, the division lines Y can be recognized on an image using known Hough conversion, random sample consensus (RANSAC), etc. In an overhead image, where the road surface is expressed two-dimensionally, the linearity of the division lines Y on the road surface is high. There is however the possibility that the images captured by the side cameras (1b and 1c) may have a distortion, etc. on the images. In such a case, however, the division lines Y can be recognized by using known image processing techniques such as those of performing image recognition after correcting a distortion, etc. and performing matching of linear lines considering a distortion, etc.

FIG. 7 shows an example of setting the parking target by detecting a vacant area by sonar (clearance sonar 33), etc. to perform automatic recognition of the parking stall. The vehicle 90 is equipped with the clearance sonar 33 (distance sensor) as a point sensor toward the lateral direction. Other distance sensors such as a single beam sensor and a laser radar may be mounted. When the vehicle 90 passes close by another vehicle 100 parked (hereinafter referred to as a parked vehicle), the clearance sonar 33 measures the distance to the parked vehicle 100, so that the parking assistance device 10 acquires surface shape information. The parking assistance device 10 then computes the degree of matching between the shape of the bumper of a general vehicle stored in the program memory 6, etc. and the surface shape information. If the surface shape information is determined to correspond with the bumper shape according to predetermined criteria, the area having this surface shape information on the reference coordinates is detected as an "already parked space." Conversely, an area that is not an "already parked space" is detected as a "vacant space."

There is the possibility that a clearance between two parked vehicles 100 parked in adjacent parking stalls may also be detected as a vacant space. Therefore, it is preferable to set a predetermined length along the forward direction of the vehicle 90 as a threshold and detect a clearance as a vacant space when the clearance is detected as not being an already parked space over a length equal to or more than the threshold. There is also the possibility that, when adjacent parking stalls are continuously detected as not being an already parked space, such areas may be detected as a vacant space for one vehicle. When such a wide vacant space is detected, the vacant space may be divided by a virtual boundary to present it as a plurality of vacant spaces. In FIG. 7, when the vehicle 90 has moved to the position shown in outline by the dot-dashed line, the vacant space is detected in the manner described above, and the parking target T is set in the vacant space.

As mentioned above under (d), a plurality of methods may be combined. That is, by recognizing the division lines Y in a vacant space on an image as described above with reference to FIG. 6, the vacant space may be detected with higher precision, to set the parking target T. In other words, a region of interest (ROI) may be set in the vacant space, to reduce the computation load in the image processing and also improve the recognition precision.

Figure 8:
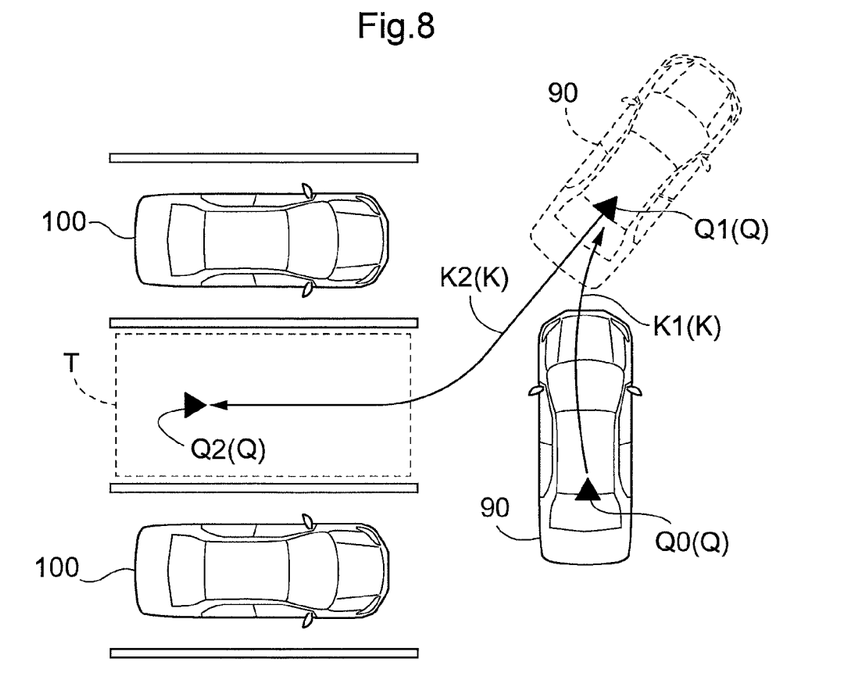
FIG. 8 is a view showing an example guide route.

As described above, the parking target T can be set by a variety of methods. As shown in FIG. 8, once the parking target T is set, the route computing section 13 computes a guide route K for allowing the vehicle 90 to move forward from an initial position QO to a reverse start position Q1 and then reverse from the reverse start position 01 to a parking completion position Q2 in the parking target T, as well as the reverse start position Q1. The positions QO to Q2 indicate the coordinates of the reference position Q of the vehicle 90 on the reference coordinates when the vehicle 90 is at the initial position, the reverse start position, and the parking completion position, respectively.

The initial position is the position at which the vehicle 90 temporarily stops in FIG. 5 or the position at which the parking target T has been set in FIGS. 6 and 7. In many cases, at the start of the parking assistance, the driver inputs the instruction via a dedicated button or a touch button on the touch panel 4b, Therefore, the position of the vehicle 90 at the time of input of the instruction may be determined as the initial position. Note that, while the reference position Q is marked with a circle in FIG. 5, the reference positions Q (QO to Q2) are marked with a triangle with an apex indicating the forward direction for the purpose of expressing the positions as vector coordinates including the orientation of the vehicle 90 in FIG. 8. The guide route K includes the forward route K1 and a reverse route K2.

Figure 9:
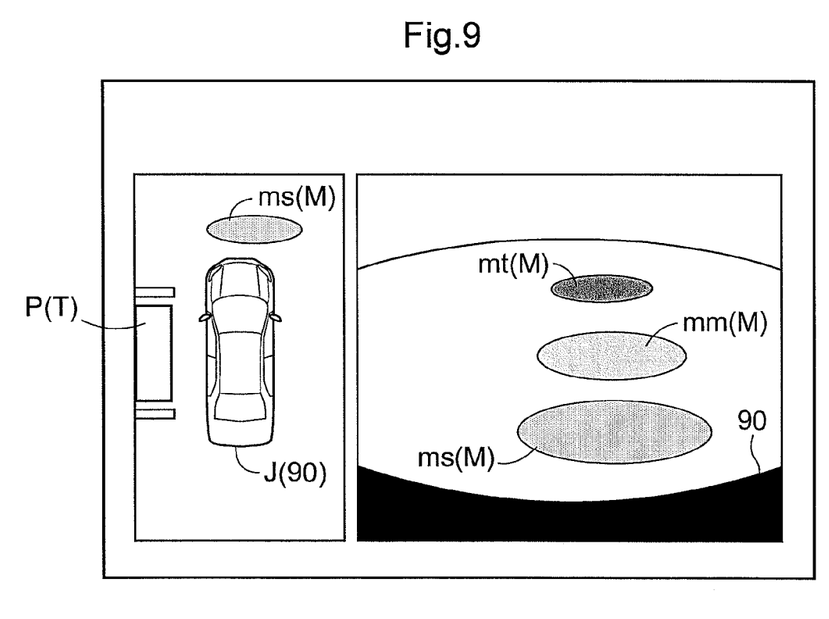
FIG. 9 is a view showing example forward guide markers during straight ahead movement.

FIGS. 9 to 11 show example screens of the monitor device 4 during the forward guide. These figures show multi-view screens where an overhead image generated by combining the images captured by the plurality of cameras 1 (1a to 1d) and a image captured by any single camera 1 are displayed side by side. Since the movement direction of the vehicle 90 is forward when the parking target T has been set and the vehicle 90 is guided according to the forward route K1, FIGS. 9 to 11 show examples where the overhead image and the front-view image captured by the front camera 1a are displayed side by side. In the overhead image, the vehicle 90 is not an image taken by the camera 1, but a vehicle icon J formed based on a previously-taken image and a drawn image. In the overhead image, also, the parking target T is highlighted as a target icon P in a frame shape (rectangular shape).

The symbol M in the overhead image and the front-view image denotes superimposed forward guide markers, which are a marker group including a plurality of markers ms, mm, and mt. The marker ms corresponds to the near marker according to the present invention, and the marker mt corresponds to the far marker according to the present invention indicating the reverse start position. The marker mm is at least one intermediate marker set between the near marker ms and the far marker mt.

FIG. 9 illustrates the forward guide markers M displayed on the monitor device 4 when the steering wheel of the vehicle 90 is at its neutral position with the steering angle being zero at the initial position. On the front-view image, all the forward guide markers M from the near marker ms located closer to the vehicle 90 to the far marker mt corresponding to the reverse start position are superimposed. The forward guide markers M are superimposed on the front-view image with the left ends of the markers being lined straight forward. On the overhead image the field of which is limited to the neighborhood of the vehicle 90 and thus does not include the reverse start position, all the forward guide markers M are not superimposed. In the example of FIG. 9, neither the far marker mt nor the intermediate marker mm is superimposed on the overhead image, and only the near marker ms set near the vehicle 90 is superimposed.

FIG. 10 illustrates the forward guide markers M displayed on the monitor device 4 when the steering wheel of the vehicle 90 is turned to the right, i.e., the steering angle is a value to the right at the initial position. As in FIG. 9, all the forward guide markers M from the near marker ms located closer to the vehicle 90 to the far marker mt corresponding to the reverse start position are superimposed on the front-view image. The forward guide markers M are superimposed on the front-view image in a manner that the series of markers are being bent to the right. As described above, since the overhead image has a field limited to the neighborhood of the vehicle 90, only the near marker ms set near the vehicle 90 is superimposed in FIG. 10.

Figure 11A:
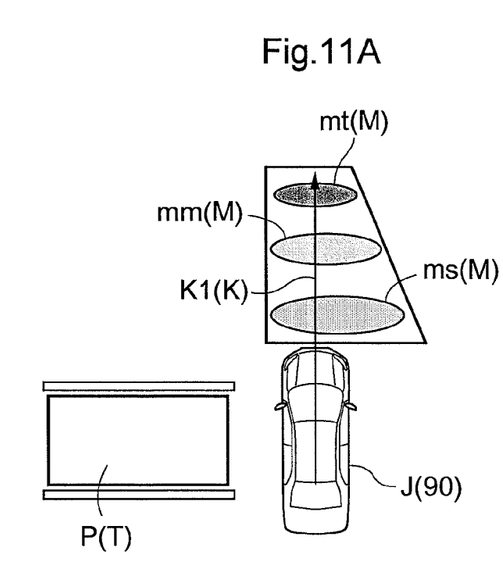
FIG. 11 shows views illustrating how the forward guide markers are converged.
Figure 11B:
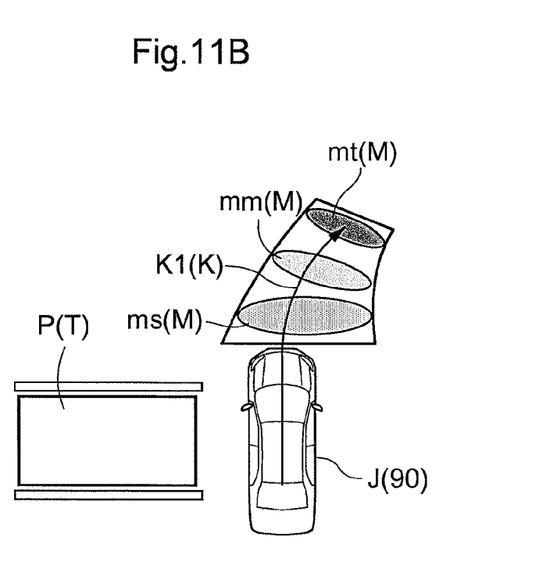

As shown in FIG. 11, the forward guide markers M indicate the forward route K1 by the arrangement of the marker group where the marker width is larger in the order from the far marker mt to the near marker ms, irrespective of the steering angle. During the straight ahead movement with the steering angle being zero, as shown in FIG. 11A, the direction of the forward route K1 is indicated with the left ends of the markers being lined straight forward, and an appearance of convergence toward the reverse start position is given by the widths of the markers reducing toward the far marker mt. During the steering to the right, as shown in FIG. 11B, the direction of the forward route K1 is indicated in a manner that the series of markers are being bent to the right, and an appearance of convergence toward the reverse start position is given by the widths of the markers reducing toward the far marker mt. In other words, the direction of the forward route K1 is indicated in a manner that the series of markers are being bent in the steering direction, and an appearance of convergence toward the reverse start position is given by the widths of the markers reducing toward the far marker mt irrespective of the steering direction.

Also, colors may be applied to the markers, to give an appearance of convergence, as well as distinguishing each marker from the others. For example, it is preferable to apply a green or blue color to the near marker ms where a comparatively wide range is allowed for movement of the vehicle 90, a red color to the far marker mt that is the forward target position, and a yellow color to the intermediate marker mm located therebetween. Note that it is preferable to apply such colors translucently so as not to impair the visibility of the shot image. Note also that the above color arrangement is a mere example and naturally any other color arrangement may be used.

In the overhead image, in particular, it is preferable to draw the near marker ms to be wider than the width of the vehicle 90 and the far marker mt to be equal to or narrower than the width of the vehicle 90. It is preferable to draw the far marker mt, which is to be the target during the forward movement as the reverse start position, to have a small width approximately the same as the width of the vehicle 90, from the standpoint of giving an appearance of convergence and thus clarifying the target. Conversely, by drawing the near marker ms, which shows the position immediately after the start of movement of the vehicle 90 with a predetermined tolerance, to have a width larger than the width of the vehicle 90, a degree of freedom can be given to the forward direction of the vehicle 90. Also, this will induce the driver to perform relaxed driving operation without feeling psychological stress against the driving operation.

For example, in FIG. 11A, the vehicle 90 can freely select any route passing through the near marker ms. If the vehicle goes forward with the steering angle kept at zero, it will pass through the leftmost portion of the near marker ms. If the vehicle is slightly turned to the right, it will pass through approximately the center of the near marker ms, and if it is further turned to the right, it will pass through the rightmost portion of the near marker ms. In FIG. 11B, the vehicle 90 can go forward with the current steering angle to the right kept unchanged, with a steering angle slightly returned to the left, or even with a steering angle further increased to the right. In this way, the large width of the near marker ms enhances the degree of freedom of the direction in which the vehicle 90 proceeds at the start of its forward movement, and thus offers the driver a wide choice of options. Note that, in either case, the markers are drawn so that the width thereof decreases toward the far marker mt from the near marker ms. Therefore, the reverse start position as the target during the forward movement is drawn with an appearance of convergence, and thus the driver can move the vehicle 90 forward while grasping the target with reliability.

Note that, in the front-view image that is a wide-angle image, the field in the width direction is narrower as the position on the image is closer to the bottom, and wider as the position is closer to the top. For example, the bumper, etc. of the vehicle 90 occupies the entirety of the width of the image at the bottom of the image. Therefore, if the near marker ms having a large width is drawn on the front-view image as is done on the overhead image, it will overrun the width of the front-view image depending on the position drawn. In view of this, in superimposition of the near marker ms on the front-view image, it is preferable to draw the near marker ms near the vehicle 90 within a range where it can be drawn without overrunning from either side of the screen. As an example, it is preferable to draw the near marker ms having a width of about half (about ⅓ to ⅔) of the width of the screen of the monitor device 4 at the initial position of the vehicle 90.

Figure 12:
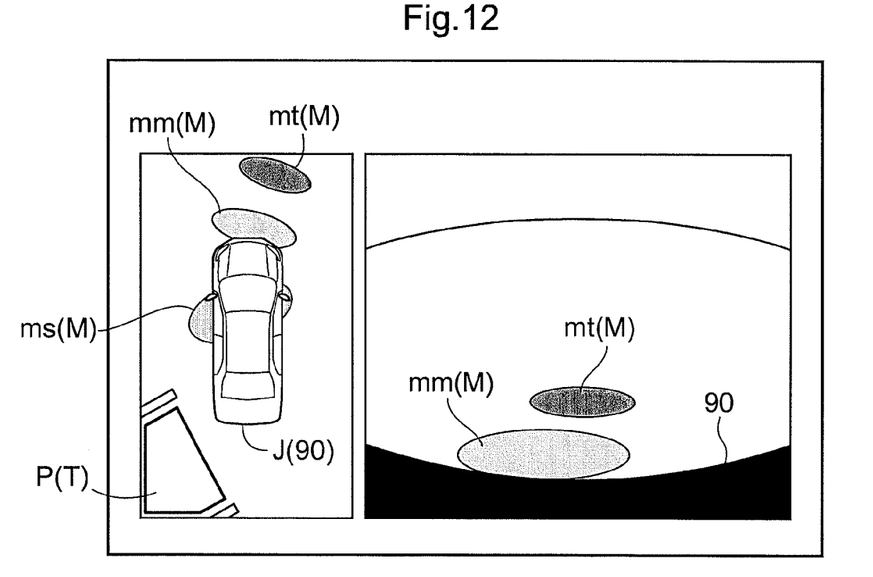
FIG. 12 is a view showing example forward guide markers during forward movement involving turning.

FIG. 12 shows the forward guide markers M after the start of forward movement of the vehicle 90. In the illustrated example, the vehicle 90 moves forward while turning to the right. With the forward movement of the vehicle 90, the vehicle 90 reaches the markers in the order from the near marker ms. When the front-view image taken by the front camera 1d that captures an image of the front of the vehicle 90 is the surrounding image, the visual point of the surrounding image is at the front end of the vehicle 90. Therefore, any marker reached by the vehicle 90, among the forward guide markers M, is behind the visual point, and thus can no more be superimposed on the surrounding image. As shown in FIG. 12, the markers disappear from the front-view image in the order from the near marker ms.

Conversely, when the surrounding image is an overhead image obtained by combining the images captured by the plurality of cameras 1, the visual point of the surrounding image is a virtual point located above the vehicle 90. With the visual point above the vehicle 90, any forward guide marker M already reached by the vehicle 90 is not behind the visual point. Also, the entire shape of the vehicle 90 is presented on the surrounding image as the vehicle icon J that is an illustration, a previously-taken picture, etc. Accordingly, in the overhead image, any forward marker M already reached by the vehicle 90 can be displayed under (on the back of) the vehicle 90 as if the vehicle 90 is proceeding over the marker even after the vehicle 90 reached the marker. By drawing the forward guide markers M under the vehicle 90 along with the forward movement of the vehicle 90, the movement history of the vehicle 90 can be shown virtually. Thus, the driver can move the vehicle 90 forward while understanding the relationship between the forward route K1 shown by the forward guide markers M and the actual movement history of the vehicle 90, and this enhances the convenience.

Figure 13:
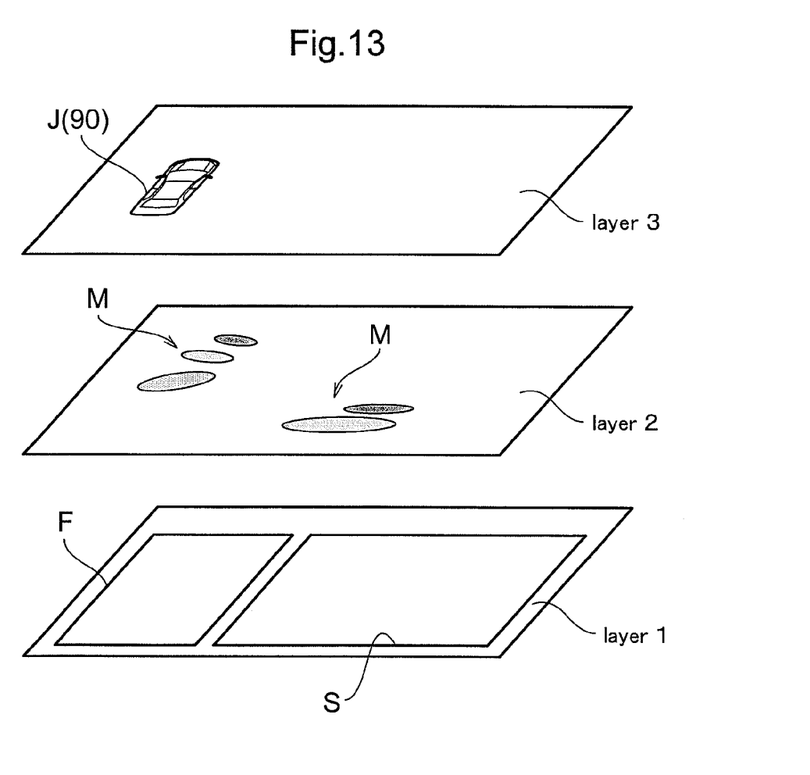
FIG. 13 is a view illustrating a layer structure of a display image.

The display control section 16 superimposes the surrounding image, the forward guide markers, other icons and messages, etc. on top of one another, and presents the resultant image to the monitor device 4 as one display image. FIG. 13 shows an example of the layer structure of the display image. For example, an overhead image F and a front-view image S are included in Layer 1 as the lowermost layer. On Layer 1 Layer 2 having the forward guide markers M drawn therein is superimposed. Further, on Layer 2, Layer 3 having the vehicle icon J representing the vehicle 90 in the overhead image is superimposed. Since the vehicle icon J is drawn in the layer above the forward guide markers M, the vehicle icon J passing over the forward guide markers M can be easily drawn.

As described above, the parking assistance device 10 includes the self-location estimating section 14 that estimates the self-location based on the detection results by the sensors that detect the movement state of the vehicle 90. The route computing section 13 updates the guide route K and the reverse start position (Q1) based on the self-location (Q) of the vehicle 90 moving toward the reverse start position (Q1) and the parking target T. The graphic control section 15 updates the forward guide markers M including at least the far marker mt based on the updated guide route K and reverse start position (Q1) and superimposes the updated ones on the surrounding image.

Figure 14:
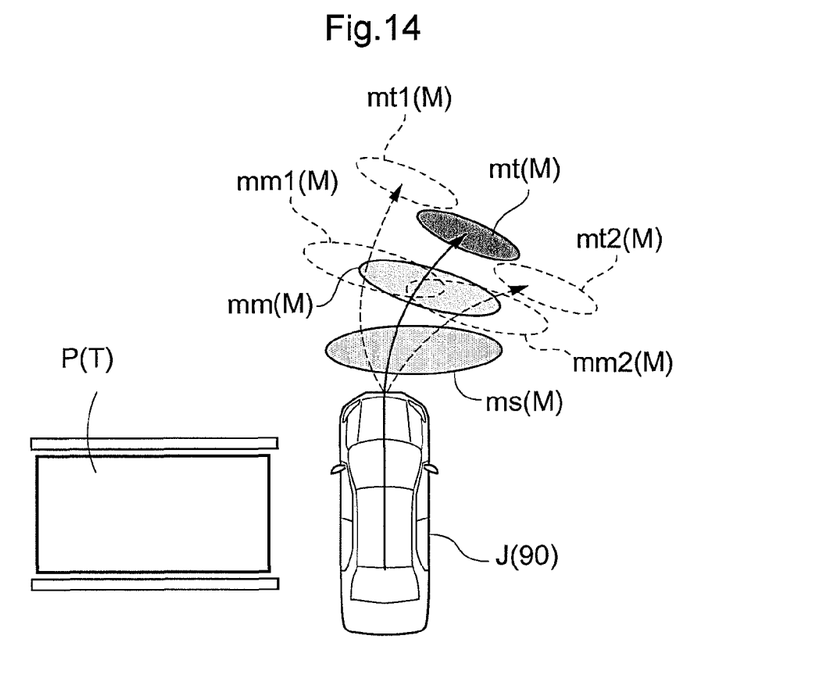
FIG. 14 is a view schematically showing the relationship between the turning direction and the change of the forward guide markers.

For example, as shown in FIG. 14, the intermediate marker mm and the far marker mt are updated according to the position in the near marker ms through which the vehicle 90 has passed. When the vehicle 90 has passed through a left-side portion of the near marker ms, the intermediate marker mm is updated to mm1 and the far marker mt to mt1. When the vehicle has passed through a right-side portion of the near marker ms, the intermediate marker mm is updated to mm2 and the far marker mt to mt2. Similarly, although illustration is omitted, according to the position in the intermediate marker mm through which the vehicle 90 has passed, another intermediate marker mm closer to the far marker mt than the preceding intermediate marker mm and the far marker mt will be updated.

In the above description, the case that the forward guide markers M were constituted by the marker group including three markers ms, mm, and mt was taken as an example. The number of markers constituting the marker group is not limited to three. It may be two at a minimum or naturally may be four or more as far as including the near marker ms and the far marker mt. Also, in the above description, the case of drawing the forward guide markers M in a circular or elliptic shape was taken as an example. Naturally, they may be in another shape such as a rectangle and a flat hexagon. The corners of such a rectangle and hexagon may be chamfered. Moreover, although the case of garage parking was taken as an example in the above description, the present invention is not limited to this, but can also be applied to parallel parking.

INDUSTRIAL APPLICABILITY

As described above, according to the present invention, it is possible to provide, with a simple configuration, a parking assistance device capable of flexibly guiding a vehicle to the reverse start position in assisting reverse parking.

DESCRIPTION OF REFERENCE SIGNS

1: Camera (car-mounted camera, surrounding detection device)
   1a: Rear camera (car-mounted camera)
   1b: Left-side camera (car-mounted camera)
   1c: Right-side camera (car-mounted camera)
   1d: Front camera (car-mounted camera)
4: Monitor device
11: Surrounding image presenting section
12: Parking target setting section
13: Route computing section
14: Self-location estimating section
15: Graphic control section
mt: Far marker
ms: Near marker
K: Guide route
K1: Forward route
M: Forward guide marker
Q1: Reverse start position
T: Parking target

The invention claimed is:

1. A parking assistance device comprising:
a surrounding image presenting section configured to receive a captured image of at least a view in a direction of movement of a vehicle taken by a car-mounted camera and allow a surrounding image of the vehicle to be displayed on a monitor device inside the vehicle, wherein a plurality of car-mounted cameras are mounted on the vehicle, and the surrounding image includes an overhead image as a composite image formed based on a plurality of images captured by the plurality of car-mounted cameras;
a parking target setting section configured to set a parking target of the vehicle;
a route computing section configured to compute a guide route for allowing the vehicle to move forward to a reverse start position and then reverse to the parking target and the reverse start position based on the parking target with a predetermined tolerance included;
a graphic control section configured to
generate a vehicle icon representing an entire shape of the vehicle,
generate forward guide markers constituted by a marker group including a far marker corresponding to the reverse start position in front of the vehicle and a near marker that represents an area via which the vehicle can reach the reverse start position and is located closer to the vehicle than the far marker, the forward guide markers indicating a forward route to the reverse start position by an arrangement of the marker group the width of which is increased toward the near marker from the far marker, and superimpose the vehicle icon and the guide markers on the surrounding image such that the vehicle icon passes over the forward guide markers when in route to the reverse start position; and the near marker has a predetermined tolerance and is drawn to be wider than the width of the vehicle; and the far marker has a predetermined tolerance and is drawn to be narrower than the width of the vehicle.

2. The parking assistance device of claim 1, further comprising:

a self-location estimating section configured to estimate the self-location based on detection results from a sensor that detects the movement state of the vehicle, wherein the route computing section updates the guide route and the reverse start position based on the self-location of the vehicle moving toward the reverse start position and the parking target, and the graphic control section updates the forward guide markers including at least the far marker based on the updated guide route and reverse start position and superimposes the updated forward guide markers on the surrounding image.

3. The parking assistance device of claim 1, wherein even after the vehicle has reached the markers constituting the forward guide markers, the graphic control section superimposes the markers on the overhead image at least until the vehicle reaches the reverse start position.

4. The parking assistance device of claim 1, wherein the near marker has a circular or elliptic shape.

* * * * *